Aug. 30, 1966    R. D. TOLBERT, JR    3,269,580
TRANSPORTABLE CONTAINER
Filed Oct. 14, 1965
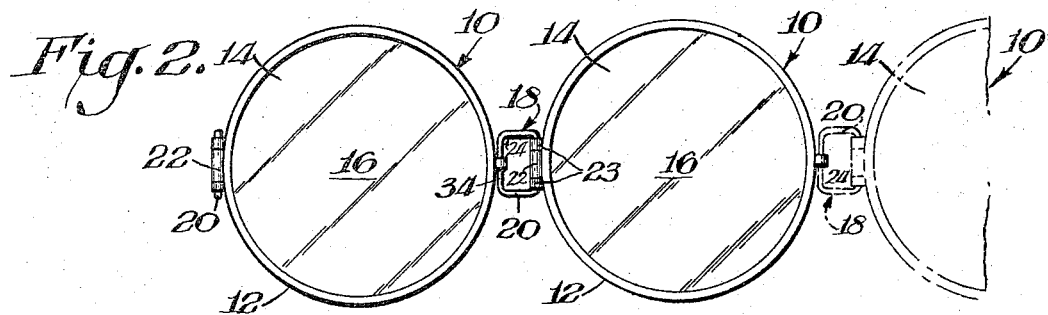
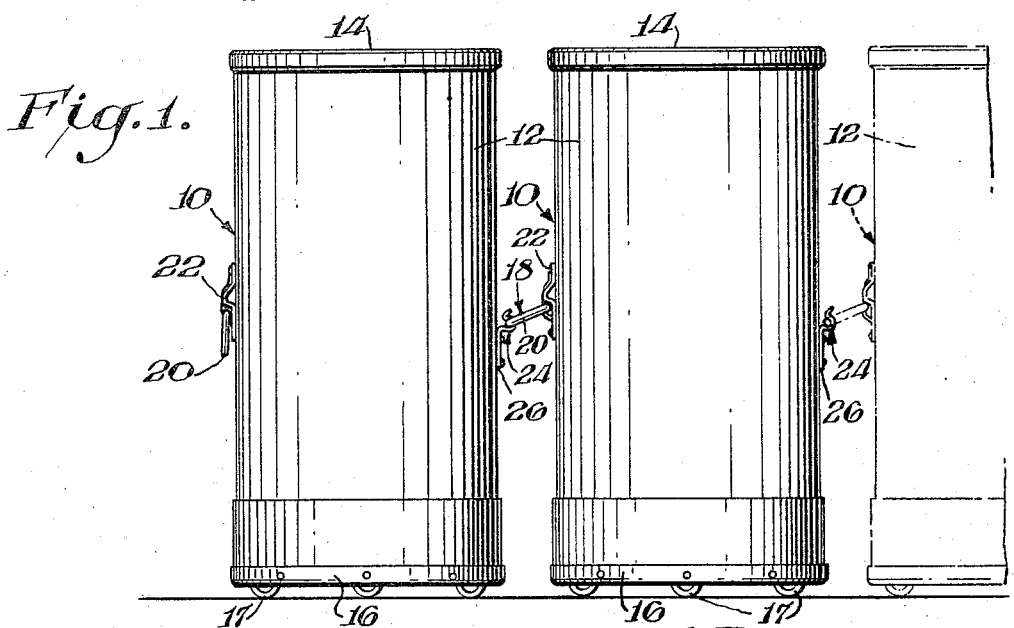
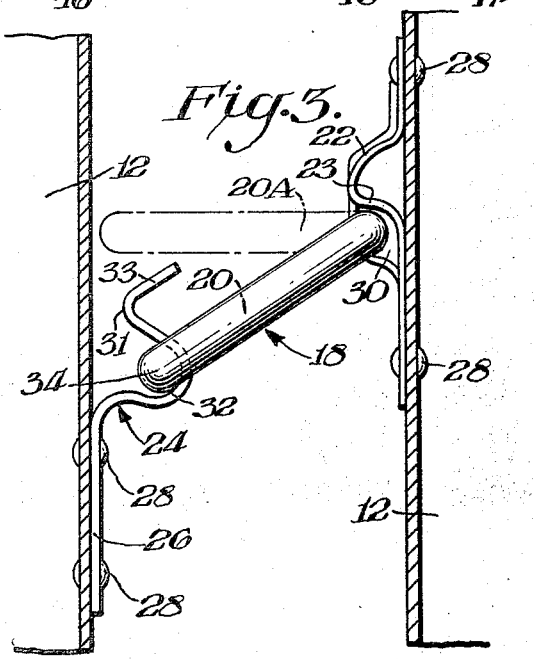

United States Patent Office 3,269,580
Patented August 30, 1966

3,269,580
TRANSPORTABLE CONTAINER
Ralph D. Tolbert, Jr., Kennett Square, Pa., assignor to NVF Company, a corporation of Delaware
Filed Oct. 14, 1965, Ser. No. 496,086
5 Claims. (Cl. 220—23.4)

This invention relates to transportable containers, and more particularly to containers or bin-like receptacles constructed of resin cured laminated fiber sheets which are used for the removal, relocation and transportation of small parts, scrap, and other particulate articles in manufacturing plants and other environments.

Existing article transporting containers may be physically lifted and carried, placed on rollable dollies for relocation, or they may be equipped with wheels to facilitate their movability. In any event, the containers are light in weight but cumbersome in bulk requiring one man to move each container. While this is economically feasible when the containers are heavily laden with articles, transportation of the empty containers for re-filling has heretofore incurred needless expense and waste of man power.

Accordingly, it is an object of this invention to provide an arrangement by which a multiple of relatively large, light weight containers may be simultaneously moved from one location to another by one individual. This may be accomplished by adding coupling devices to the side portions of the movable containers thereby providing means to interconnect a plurality of these containers for transportation as a group by one worker.

Another object of this invention is to provide a coupling mechanism which is both inexpensive and convenient to operate.

Another object of this invention is to provide a coupling arrangement which includes a dual purpose loop member operable as a coupling element as a manual handle to pull a train of interconnected containers.

Novel features and advantages of the present invention will become apparent to one skilled in the art from a reading of the following description in conjunction with the accompanying drawings wherein similar reference characters refer to similar parts, and in which:

FIG. 1 is a side elevational view of a plurality of interconnected containers coupled in accordance with this invention;

FIG. 2 is a top plan view of the containers shown in FIG. 1; and

FIG. 3 is a fragmentary view on an enlarged scale of a portion of the coupling arrangement.

As shown in FIGS. 1 and 2, the container or receptacle 10 has an elongated hollow cylindrical body 12 made of resin cured compressed fiber sheet material. The receptacle 10 has at its uppermost end an article receiving opening 14 and at its lowermost end a base or bottom plate 16. The base plate 16 has anti-friction means such as rollable casters 17 mounted thereto to facilitate moving of the receptacle. While the container may be made of other light weight materials and in other shapes and designs, the fiber bin illustrated is representative of the light weight but large and cumbersome containers where the features of this invention find particular usefulness.

The container 10 has coupling means 18 consisting of a tubular or rolled rectangular shaped loop 20 pivotally mounted for vertical shifting within a flanged, U-shaped bracket 22, and mating S-shaped catch means 24 having an elongated vertical extension 26. The loop 20 and the S-shaped catch 24 are secured to the external substantially vertical side portions of the body 12 so that they are positioned oppositely of one another.

In FIG. 3 is illustrated the details of the coupling means 18 which are mounted on the sides 12 of similar receptacles 10. On one side 12 a flanged U-shape bracket 22 is secured by suitable means such as rivets 28. The U-bracket provides a support and pivotable area 30 for loop 20. Abutments 23 are provided to limit upward swinging of the loop 20 to a laterally outward position where it is useful as a handle. Upon the opposite wall portion 12 of the other receptacle an S-shaped link 24 is secured thereto by suitable means such as rivets 28.

As shown in FIG. 3, the loop 20 is rotated upward to the horizontal position shown in phantom at 20A, and then downward behind the extended portion 33 of the S-shape catch 24 to bear or slide against the wall 12 behind the inwardly curved surface 31, causing that surface to be biased outwardly from its normal position. The loop 20 continues moving downward past the inwardly curved surface 31 thus allowing the S-shaped link to spring back to its untensioned position whereby the loop 20 becomes entrapped within the outwardly curved portion 32.

This coupling arrangement may be repeated for each successive receptacle 10 until the desired number of units are interconnected to form a train-like formation. The loop 20, because of its design, also serves as a useful and convenient handle to pull the coupled containers as a group to a desired location.

A plurality of catches 24 may be arranged on each of the containers so that each has a pair of similar containers secured to it to form a wedge-like train. Thus the loop on the first receptacle of the train serves as a handle, while a pair of receptacles are coupled to the catches on the first receptacle to form a second row. Correspondingly a pair of receptacles are coupled to each of the second row of receptacles, and so on.

The selection of an S shape for the catch 24 and the closed ring shaped loop 20 is particularly desirable. For example the upwardly and outwardly inclined tip 33 of the S provides a guide surface to assure that the loop 20 will accurately slide down behind the catch 24. Additionally, the inward contour 31 provides an effective means of maintaining the loop 20 locked in place. Moreover, the inclination and spacing of the free S-shaped end of the catch 24 away from the wall 12 also permits the loop 20 to slide easily into the lower zone where it remains trapped behind the contour 32. The elongated front portion 34 of the loop 20 provides a wide surface to facilitate a more rapid coupling of the loop and the catch, as well as being a convenient handle which is easier to grasp than, for example, a completely circular ring would be.

While the above described embodiment constitutes the preferred mode of carrying out this invention, other modifications and equivalents may be resorted to within the scope of the actual invention, which is claimed as follows.

What is claimed is:
1. A transportable container comprising a container portion having opposed substantially vertical sides and ground-engaging anti-friction means secured to the base of the container to facilitate the movability of the container, a vertically shiftable handle externally secured to one side of the container at a predetermined height, handle catch means externally secured to the opposed side of the container at a predetermined height relative to the handle, the catch means having an upwardly projecting resilient member, the member being substantially S-shaped whereby a handle from a similar container may slide downwardly behind the resilient member and be trapped by the catch means for coupling together successive containers for movability as a group.

2. A transportable container as in claim 1 wherein the catch means has an elongated extension at the lower end of its S-shaped resilient member, the extension being secured to the side of the container, and the S-shaped resilient member being normally positioned a predetermined distance from the container side.

3. A transportable container as in claim 1 wherein the handle comprises a metal loop and wherein a flanged bracket is secured to the side of the container, the loop being pivotally mounted within the bracket for vertical shifting between a downwardly directed position and a laterally outwardly directed position.

4. A transportable container as in claim 3 wherein the portion of the loop remote from the bracket is elongated and straight.

5. A transportable container as in claim 1 in combination with a plurality of similar containers, each of the containers having one of the handles secured to one side and one of the catch means secured to the side opposite the handle, a handle secured to one of the receptacles being free to act as a manual handle, and the remaining loops being coupled in the catch means on adjacent containers to form a group of the containers.

No references cited.

THERON E. CONDON, *Primary Examiner.*

J. B. MARBERT, *Assistant Examiner.*